(12) United States Patent
Fukuda et al.

(10) Patent No.: US 8,286,204 B2
(45) Date of Patent: Oct. 9, 2012

(54) DATA COMMUNICATION SYSTEM, APPARATUS AND CONTROL METHOD THEREFOR

(75) Inventors: Tetsu Fukuda, Kawasaki (JP);
Yoshikazu Shibamiya, Yokohama (JP);
Katsuhiro Miyamoto, Isehara (JP);
Takashi Yamamoto, Yamato (JP);
Yuichi Matsumoto, Kawasaki (JP);
Shuntaro Aratani, Machida (JP);
Masaki Kutsuna, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 10/980,290

(22) Filed: Nov. 4, 2004

(65) Prior Publication Data

US 2005/0172332 A1 Aug. 4, 2005

Related U.S. Application Data

(63) Continuation of application No. 09/579,532, filed on May 26, 2000, now abandoned.

(30) Foreign Application Priority Data

Jun. 1, 1999 (JP) .................................. 11-154371

(51) Int. Cl.
*G06F 13/00* (2006.01)
*H04N 7/173* (2011.01)
*H04N 5/44* (2011.01)

(52) U.S. Cl. ................ 725/37; 725/38; 725/80; 725/52; 725/78; 725/100; 725/131; 725/139; 725/151; 348/734; 715/762; 715/733

(58) Field of Classification Search .................. 715/762, 715/733; 345/156, 734
See application file for complete search history.

(56) References Cited

U.S. PATENT DOCUMENTS

| | | | | |
|---|---|---|---|---|
| 5,500,794 | A | * | 3/1996 | Fujita et al. ..................... 700/83 |
| 5,648,813 | A | * | 7/1997 | Tanigawa et al. ............. 725/139 |
| 5,648,824 | A | | 7/1997 | Dunn et al. ..................... 725/37 |
| 5,793,366 | A | | 8/1998 | Mano et al. .................. 345/839 |
| 5,883,621 | A | | 3/1999 | Iwamura ....................... 725/131 |
| 6,148,241 | A | * | 11/2000 | Ludtke et al. ................... 700/83 |
| 6,211,800 | B1 | | 4/2001 | Yanagihara et al. ............ 341/50 |
| 6,288,716 | B1 | * | 9/2001 | Humpleman et al. ......... 715/733 |
| 6,295,479 | B1 | * | 9/2001 | Shima et al. .................... 700/83 |
| 6,314,326 | B1 | | 11/2001 | Fuchu ............................ 700/17 |
| 6,400,280 | B1 | | 6/2002 | Osakabe ...................... 348/734 |

(Continued)

FOREIGN PATENT DOCUMENTS

JP 2-105799 4/1990

(Continued)

*Primary Examiner* — Jun Fei Zhong

(74) *Attorney, Agent, or Firm* — Fitzpatrick, Cella, Harper & Scinto

(57) ABSTRACT

A control system includes a control apparatus and a controlled apparatus, wherein the control apparatus is remotely controlled by a remote controller. The controlled apparatus transmits a control panel to the control apparatus. The control panel includes icons used to control the controlled apparatus. The controlled apparatus includes (a) a communication unit which receives, from the control apparatus, remote control information including information about operation keys included in the remote controller, the remote control information being received before the controlled apparatus transmits the control panel to the control apparatus, and (b) a modifying unit which modifies a position of the icons included in the control panel according to the remote control information. The communication unit transmits the control panel to the control apparatus after the modifying unit modifies the position of the icons included in the control panel according to the remote control information.

18 Claims, 12 Drawing Sheets

U.S. PATENT DOCUMENTS

| | | | |
|---|---|---|---|
| 6,421,069 B1 * | 7/2002 | Ludtke et al. | 715/762 |
| 6,453,110 B1 | 9/2002 | Kawamura et al. | 386/46 |
| 6,456,892 B1 * | 9/2002 | Dara-Abrams et al. | 700/83 |
| 6,496,860 B2 | 12/2002 | Ludtke et al. | 709/223 |
| 6,496,927 B1 * | 12/2002 | McGrane et al. | 713/1 |
| 6,523,696 B1 * | 2/2003 | Saito et al. | 709/223 |
| 6,593,937 B2 | 7/2003 | Ludtke et al. | 348/563 |
| 6,738,835 B1 * | 5/2004 | Kato et al. | 710/10 |
| 6,745,252 B1 * | 6/2004 | Yanagawa et al. | 710/8 |
| 6,940,562 B2 * | 9/2005 | Sato | 348/734 |
| 2002/0047945 A1 * | 4/2002 | Tanigawa et al. | 348/734 |

FOREIGN PATENT DOCUMENTS

| | | |
|---|---|---|
| JP | 8-168085 | 6/1996 |
| JP | 11-032381 | 2/1999 |

* cited by examiner

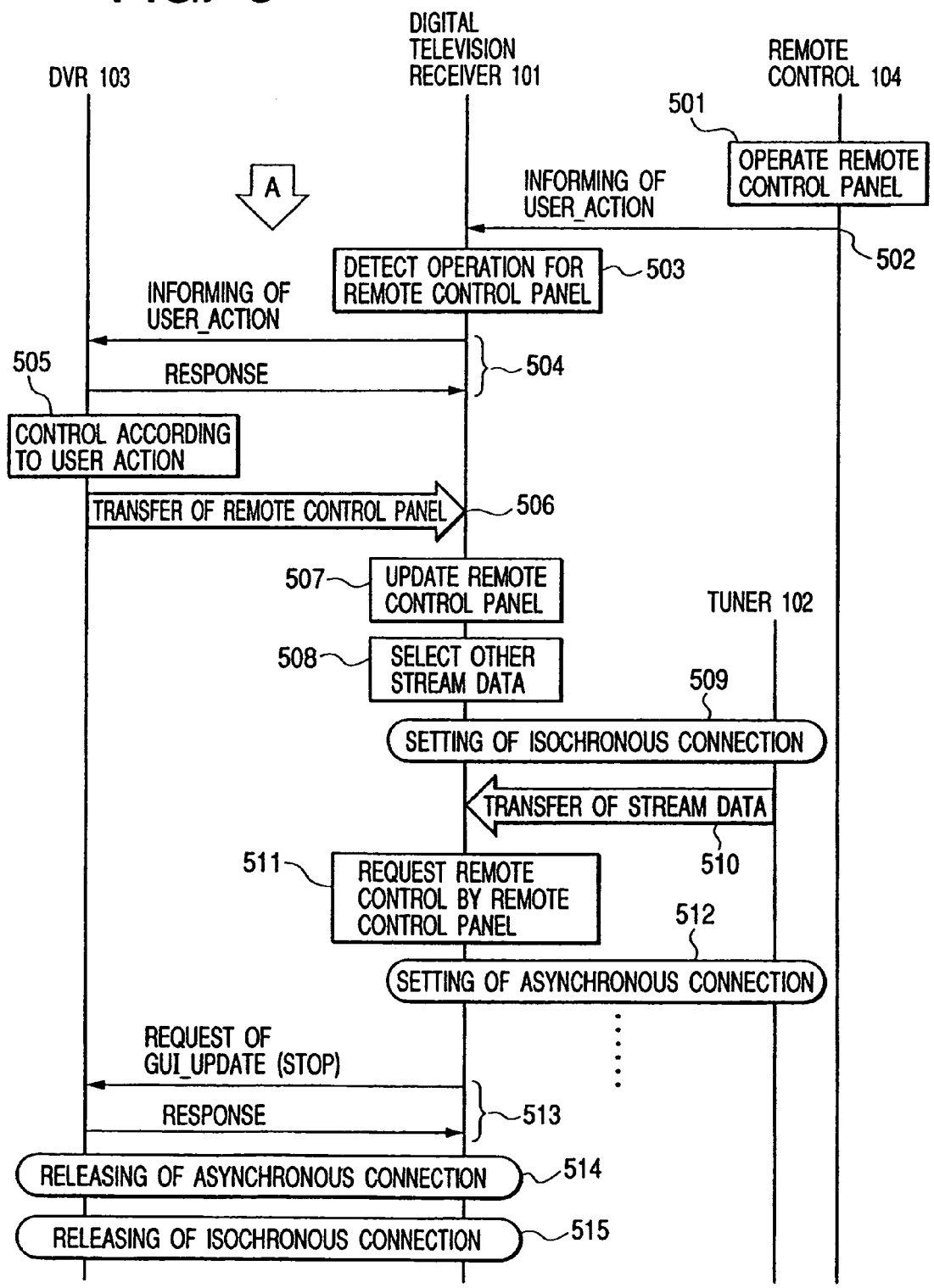

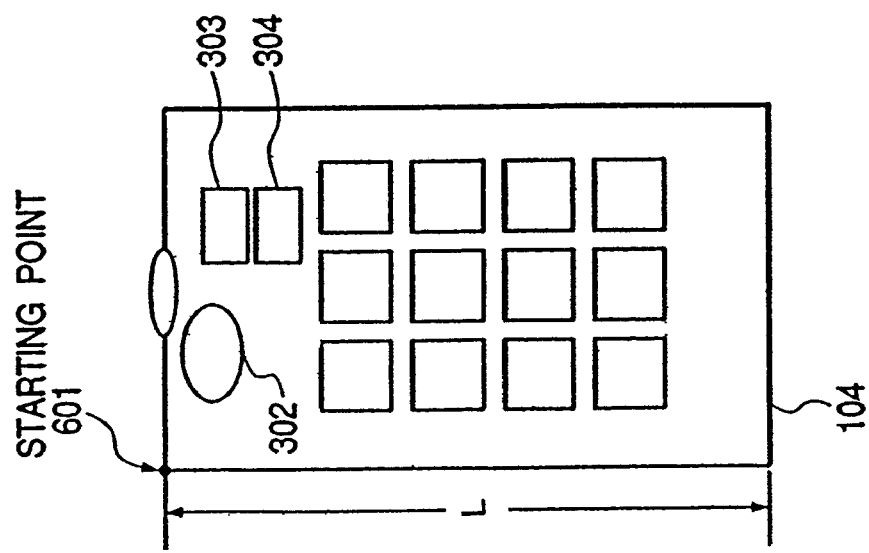

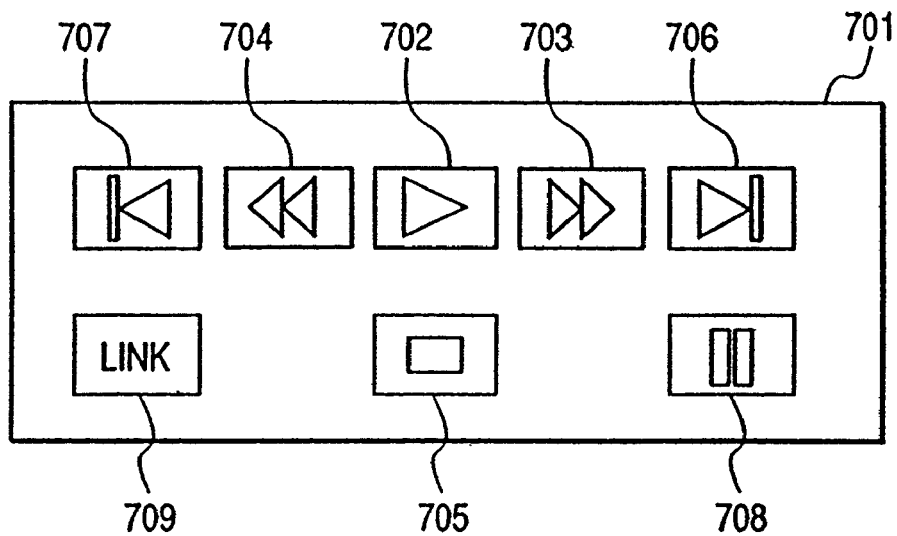

FIG. 10

| ICON INFORMATION | KEY ID |
|---|---|
| ▷ | 7 |
| ▷▷ | 8 |
| ◁◁ | 6 |
| ▢ | 10 |
| ▷| | 5 |
| |◁ | 3 |
| ‖ | 9 |
| LINK | 11 |

| DEVICE ID | NODE ID | KEY ID 0 | 1 | 2 | 3 | 4 | 5 | 6 | --- |
|---|---|---|---|---|---|---|---|---|---|
| bbbbbbbb | 3 | ---- | ---- | ---- | |◁ | ---- | ▷| | ◁◁ | |
| cccccccc | 2 | | | | | | | | |
| ⋮ | ⋮ | ⋮ | ⋮ | ⋮ | ⋮ | ⋮ | ⋮ | ⋮ | ⋮ |

1101 / 1102 / 1100

DATA COMMUNICATION SYSTEM, APPARATUS AND CONTROL METHOD THEREFOR

This application is a continuation of application Ser. No. 09/579,532, filed May 26, 2000 (pending).

BACKGROUND OF THE INVENTION

1. Field of the Invention

The present invention relates to a data communication system, an apparatus and a control method therefor, and more particularly to a technology for providing a remote control environment suitable for a controlled apparatus connected to a network.

2. Related Background Art

With the recent progress in the digital signal processing technology, there is being developed so-called multi-media communication technology for delivering digitized image information (including still image and moving image), audio information, control information etc. to individual home through a disk medium, an ISDN communication network, a satellite digital Communication network, a cable television network etc.

On the other hand, for use in individual home, there is being developed so-called home network technology for connecting the television receiver, video cassette recorder (VCR), digital satellite broadcast receiving tuner etc. through a common digital interface, in order to provide a new service based on digital information from various media.

Once such home network is constructed in the home, the image information received by a satellite broadcast receiving tuner or the image information reproduced by a VCR can be viewed by plural display devices (television receiver, monitor of personal computer etc.) whereby provided is a service in a novel mode of use that has not been realized.

However, in order to realize the new service or new mode of use in such home network environment, the user has to execute a sequence of certain operations, regardless whether desired devices are directly operated or are remote controlled by a certain device. In either case, it is required to realize a user interface which is simple, visually easily understandable and capable of preventing complication in the operation sequence and confusion of the user.

SUMMARY OF THE INVENTION

An object of the present invention is to solve the above-described drawbacks.

Another object of the present invention as to realize an operation environment which is simple, easy to understand and suitable for a controlled device connected to a network.

The above-mentioned objects can be attained, according to a preferred embodiment of the present invention, by a data communication system comprising:

a) a first device for holding a control panel for providing a predetermined operation environment;

b) a second device for displaying the control panel; and c) an operation device for operating the control panel displayed by the second device;

wherein the first device is adapted to change the control panel based on the operation device.

According to another embodiment, there is also provided a data communication apparatus comprising:

a) a holding unit for holding a control panel for providing a predetermined operation environment;

b) a changing unit for changing the control panel based on an operation device for operating the control panel displayed on an external device; and c) a transmission unit for transmitting the control panel to the external device.

According to another embodiment, there is also provided a control method for controlling a data communication apparatus holding a control panel for providing a predetermined operation environment, the method comprising:

a) a changing step of changing the control panel, based on an operation device for operating the control panel displayed on an external device; and b) a transmission step of transmitting the control panel to the external device.

According to another embodiment, there is also provided a data communication apparatus comprising:

a) a transmission unit for transmitting information relating to an operation device for operating a control panel providing a predetermined operation environment to an external device holding the control panel; and b) a display control means for displaying the control panel transmitted from the external device on a display device.

According to another embodiment, there is also provided a control method for controlling a data communication apparatus comprising:

a) a transmission step of transmitting information relating to an operation device for operating a control panel providing a predetermined operation environment to an external device holding the control panel; and b) a display control step of displaying the control panel transmitted from the external device on a display device.

Still other objects of the present invention, and the features thereof, will become fully apparent from the following detailed description of the embodiments.

BRIEF DESCRIPTION OF THE DRAWINGS

FIG. 5 is a view showing the sequence of remote control in the above-mentioned embodiment;

FIGS. 6A and 6B are views respectively showing examples of remote controller information and a table storing such remote controller information;

FIG. 7 is a view showing an example of the remote control panel in the above-mentioned embodiment;

FIG. 8 is a view showing an example of the order of priority set in icons constituting the remote control panel shown in FIG. 7;

FIG. 10 is a view showing an example of a table in which the icon information and the key ID are correlated;

FIG. 11 is a view showing an example of a table managing the remote control panel of each controlled device;

DESCRIPTION OF THE PREFERRED EMBODIMENTS

The preferred embodiments of the present invention will now be described in detail hereinafter with reference to the accompanying drawings.

In the following there will be explained, with reference to the accompanying drawings, the communication system, apparatus of the present invention, method and computer readable memory medium therefor.

Figure 1:
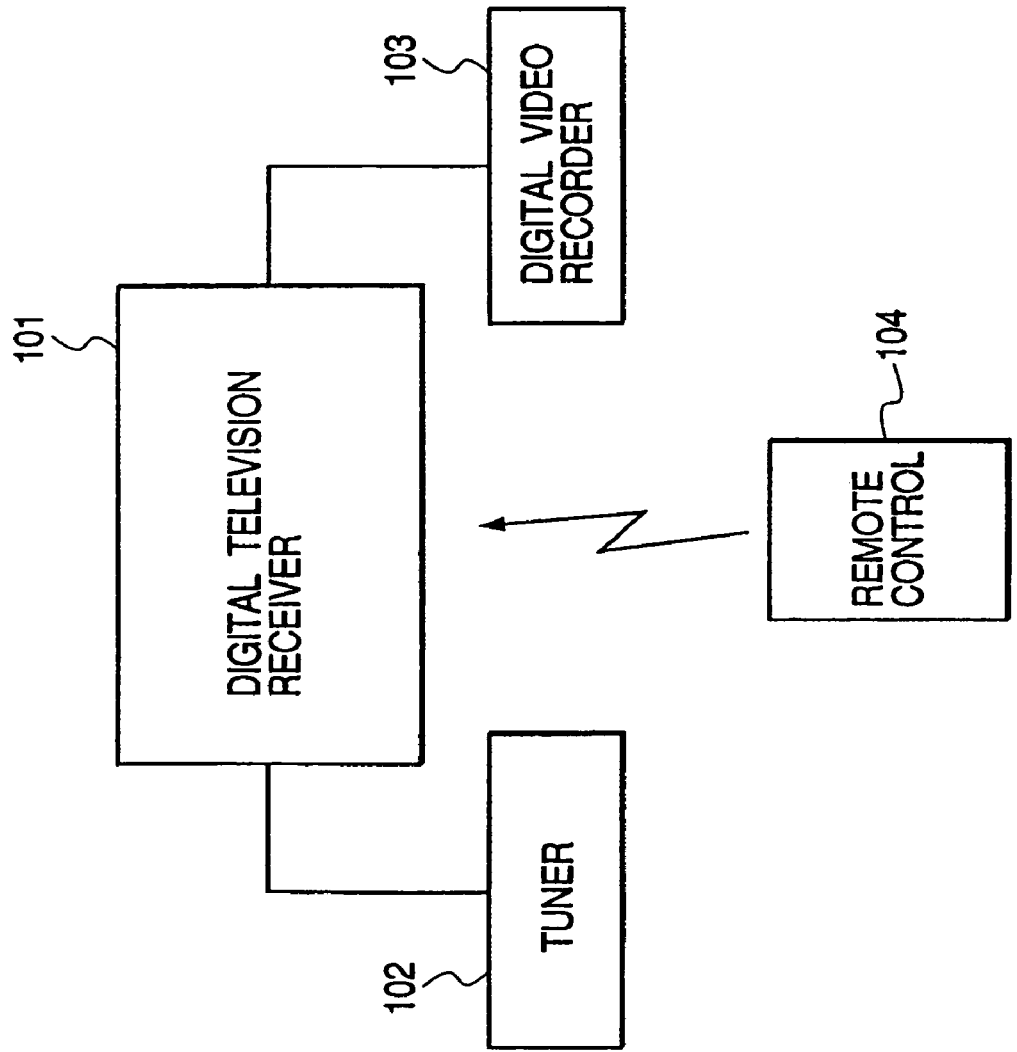
FIG. 1 is a block diagram having an example of the data communication system embodying the present invention.

FIG. 1 is a block diagram showing an example of a communication system realizing an operation environment based on the user interface embodying the present invention.

In FIG. 1, there are shown a digital television receiver 101; a tuner 102 for receiving digital satellite broadcasting; a digital video recorder (DVR) 103; and a remote control unit (remote controller) 104 for remote controlling the digital television receiver 101 by wireless transmitting the operation input of the user thereto. The remote controller 104 and the digital television receiver 101 executes wireless communication for example by the infrared communication method.

The devices are mutually connected with high-speed digital interfaces based on the IEEE1394-1995 standard (hereinafter called 1394 interfaces), thereby constituting a serial bus network. The 1394 interface of each device transfers the image information (including moving image and still image), audio information, control information etc. from other media to other devices without sacrificing the real-time property.

Referring to FIG. 1, the digital television receiver 101 functions as a remote control device while the tuner 102 and the DVR 103 function as controlled devices.

Each of the controlled devices (tuner 102, DVR 103) has a function of generating an operation panel image (hereinafter called remote control panel) for remote controlling the own device, and a function of transmitting such remote control panel in response to a request from the remote control device (digital television receiver 101). Also each of the controlled devices (tuner 102, DVR 103) controls its process operation based on the operation input entered through the remote control panel.

The remote control device (digital television receiver 101) has a function of requesting the remote control panel to a controlled device for which the user requests remote control operation, and displaying such remote control panel. The remote control device (digital television receiver 161) also has a function of transmitting the operation input of the user on the remote control panel to each controlled device (tuner 102, DVR 103).

The remote control panel means a graphical user interface (GUI) composed of image information and character information and practically including plural operation keys representing the remote controllable functions of the controlled device. Each operation key is composed for example of an icon representing the function, corresponding to such operation key, by a pattern or characters.

Figure 2:
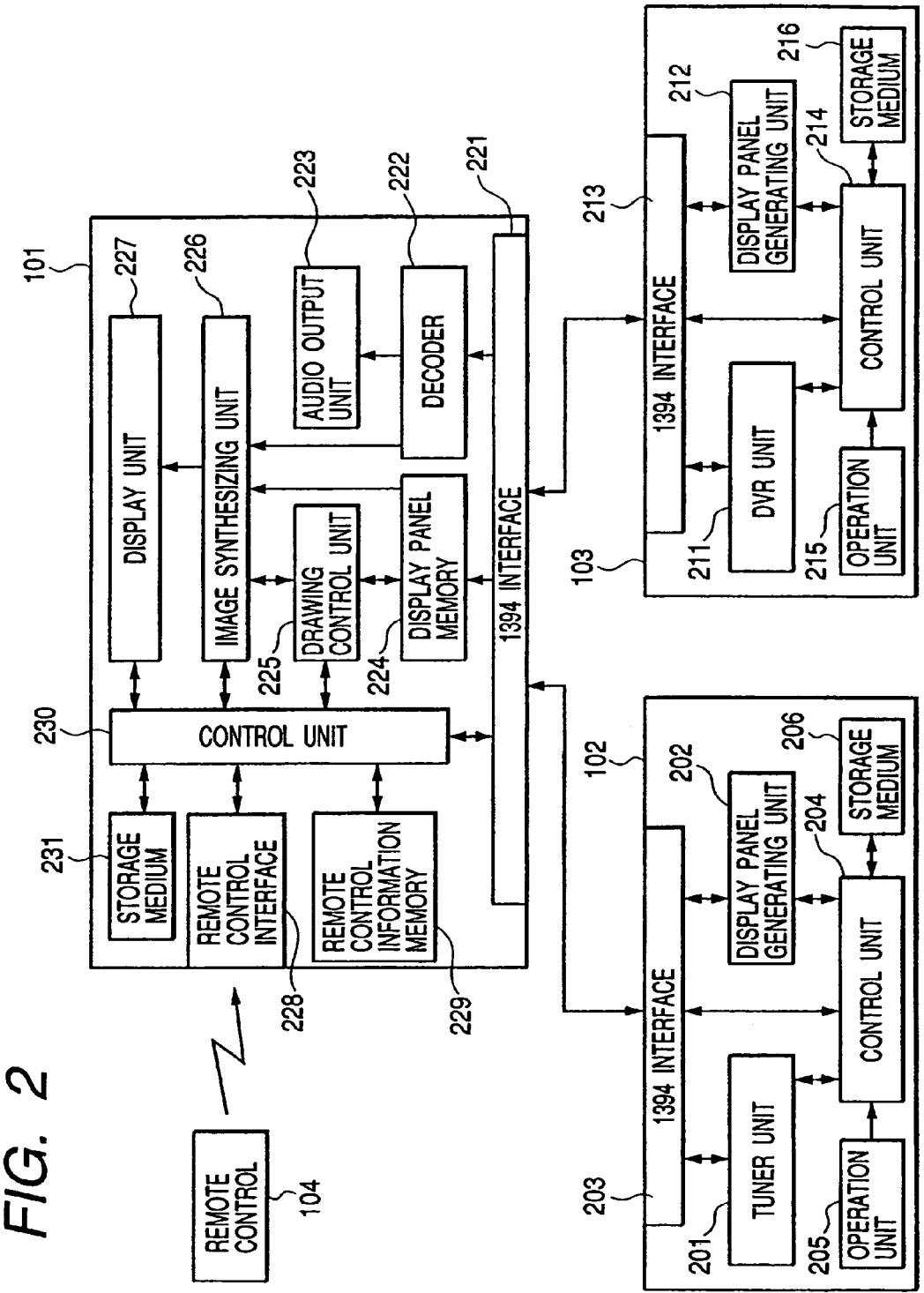
FIG. 2 is a block diagram showing the configuration of devices constituting the data communication system of the above-mentioned embodiment.

FIG. 2 is a block diagram showing the detailed configuration of the devices constituting the communication system shown in FIG. 1.

At first there will be explained the configuration of the tuner 102. In the present embodiment, the tuner 102 can be remote controlled through the remote control panel supplied by the tuner 102 itself. Such remote control panel is displayed in the display screen of the digital television receiver 101.

A tuner unit 201 has a function of receiving various contents from a disk medium, an ISDN communication network, a satellite digital communication network, a ground wave digital broadcasting network, a cable television network etc. The tuner unit 201 transmits, to a 1394 interface 203, the arbitrary content selected through an operation unit 205 or a remote control panel to be explained later. Each content includes image information, audio information etc. encoded with a high-efficiency encoding method (MPEG2, SD-DVCR, SDL-DVCR etc.).

A display panel generation unit 202 serves to generate the remote control panel for remote controlling the tuner 102 itself. The display panel generation unit 202 stores a basic remote control panel in advance in a memory and reconstructs such remote control panel when required.

A 1394 interface 203 converts the content supplied from the tuner unit 201, into stream data according to a first communication protocol and executes real-time transfer of the stream data to a desired device. The 1394 interface 203 also executes transfer of the remote control panel, supplied from the display panel generation unit 202, to the digital television receiver 101 according to a second communication protocol.

The first communication protocol means a protocol utilizing the isochronous transfer, for example based on the IEC61883 standard. In the present embodiment, the first communication protocol will be hereinafter called AV/C (audio video/control) protocol. In the AV/C protocol, the communication between certain devices is controlled by setting an input/output plug between a source transmitting the content and a destination receiving such content. The AV/C protocol also defines a procedure of packetizing the content, obtained by high-efficiency encoding by MPEG2, SD-DVCR, HD-DVCR or SDL-DVCR, by a predetermined data block and transferring each packet data as the stream data.

The second communication protocol means a protocol utilizing the asynchronous transfer. In the present embodiment, the second communication protocol will be hereinafter called asynchronous serial bus connection protocol. In the asynchronous serial bus connection protocol, there is set an input/output plug between the source and the destination, and object data, divided into one or more segments, are asynchronous transferred through such input/output plug. Such transfer protocol is highly reliable because it is not based on the isochronous transfer but on the asynchronous transfer and is suitable for the transfer of the object data which do not require real-time property but requires secure transfer. Also it can realize efficient transfer, utilizing the available time in the asynchronous transfer period, and without occupying each communication cycle as in the case of the isochronous transfer method.

A control unit 204 has a microcomputer and serves to control the function of the tuner 102.

An operation unit 205 is provided in the tuner 102 itself.

A memory medium 206 serves to store various programs that can be read by the control unit 204. For example it stores a program for generating the remote control panel and a program for realizing the communication sequence of the present embodiment, to be explained later.

In the following there will be explained the configuration of the DVR 103. In the present embodiment, the DVR 103 can be remote controlled through the remote control panel supplied by the DVR 103 itself. Such remote control panel is displayed in the display screen of the digital television receiver 101, as in the case of the tuner 102.

A DVR unit 211 executes recording and reproduction of the image information or audio information obtained by high-efficiency encoding by MPEG2 SD-DVCR, HD-DVCR or SDL-DVCR. The DVR unit 211 outputs the arbitrary content, selected through an operation unit 215 or the remote control panel to a 1394 interface 213.

A display panel generation unit 212 serves to generate the remote control panel for remote controlling the DVR unit 211 itself. The display panel generation unit 212 stores a basic remote control panel in advance in a memory and reconstructs such remote control panel when required.

A 1394 interface 213 converts the content, supplied from the DVR unit 211, into stream data according to the AV/C protocol and executes real-time transfer of the stream data to a desired device. The 1394 interface 213 also executes transfer of the remote control panel, supplied from the display panel generation unit 212, to the digital television receiver 101 according to the asynchronous serial bus connection protocol.

A control unit 214 has a microcomputer and serves to control the function of the DVR 103.

An operation unit 215 is provided in the DVR 103 itself.

A memory medium 216 serves to store various programs that can be bread byte control unit 214. For example it stores a program for generating the remote control panel and a program for transmitting the remote control panel to the digital television receiver 101.

In the following there will be explained the configuration of the digital television receiver 101.

A 1394 interface 221 receives the stream data, isochronous transferred from the tuner 102 or the DVR 103 according to the AV/C protocol and supplies a decoder unit 222 with such stream data. The 1394 interface 221 also receives the remote control panel, asynchronous transferred from the tuner 102 or the DVR 103 according to the asynchronous serial bus connection protocol and supplies a display panel memory 224 with such remote control panel.

A decoder unit 222 decomposes the stream data, supplied from the 1394 interface 221, into a video stream and an audio stream and decodes each stream data.

An audio output unit 223 executes D/A conversion and amplification of the audio stream, decoded in the decoder unit 222, and outputs such audio stream through a loudspeaker.

A display panel memory 224 serves to store the remote control panel, asynchronous transferred from another electronic device.

A drawing control unit 225 serves to control the drawing process for the remote control panel in the tuner 102 and the DVR 103. The drawing control unit 225 controls the position, range, period, start time etc. of drawing of each remote panel and whether the remote control panel can be superposed with another remote control panel.

An image synthesis unit 226 synthesizes the image information supplied from the decoder unit 222 and at least a remote control panel supplied from the drawing control unit 225 and supplies a display unit 227 with thus synthesized image.

A display unit 227 is composed of a display device such as a CRT, a liquid crystal panel or a plasma display.

An interface 228 for remote control receives control information (for example operation input by the user) from the remote controller 104. The remote control interface 228 supplies a control unit 230 with the received control information. The remote control interface 228 supports a wireless communication such as infrared communication.

A remote control information memory 229 stores remote control information of the remote controller 104. The remote control information includes information on the position, size and shape of the plural operation keys of the remote controller 104 (namely information on key configuration and information on the outer frame of the remote controller. The remote control information of the remote control information memory 229 can be transferred to other device by the asynchronous serial bus connection protocol.

A control unit 230 has a microcomputer and serves to control the process operation of the digital television receiver 101. The control unit 230 also asynchronous transfers the operation input, executed on the remote control panel, to a device corresponding to such remote control panel.

A memory medium 231 serves to store various programs that can be read by the control unit 230. For example it stores a program for controlling the drawing process of the remote control panel and a program for receiving the remote control panel of a desired electronic device.

Figure 3:
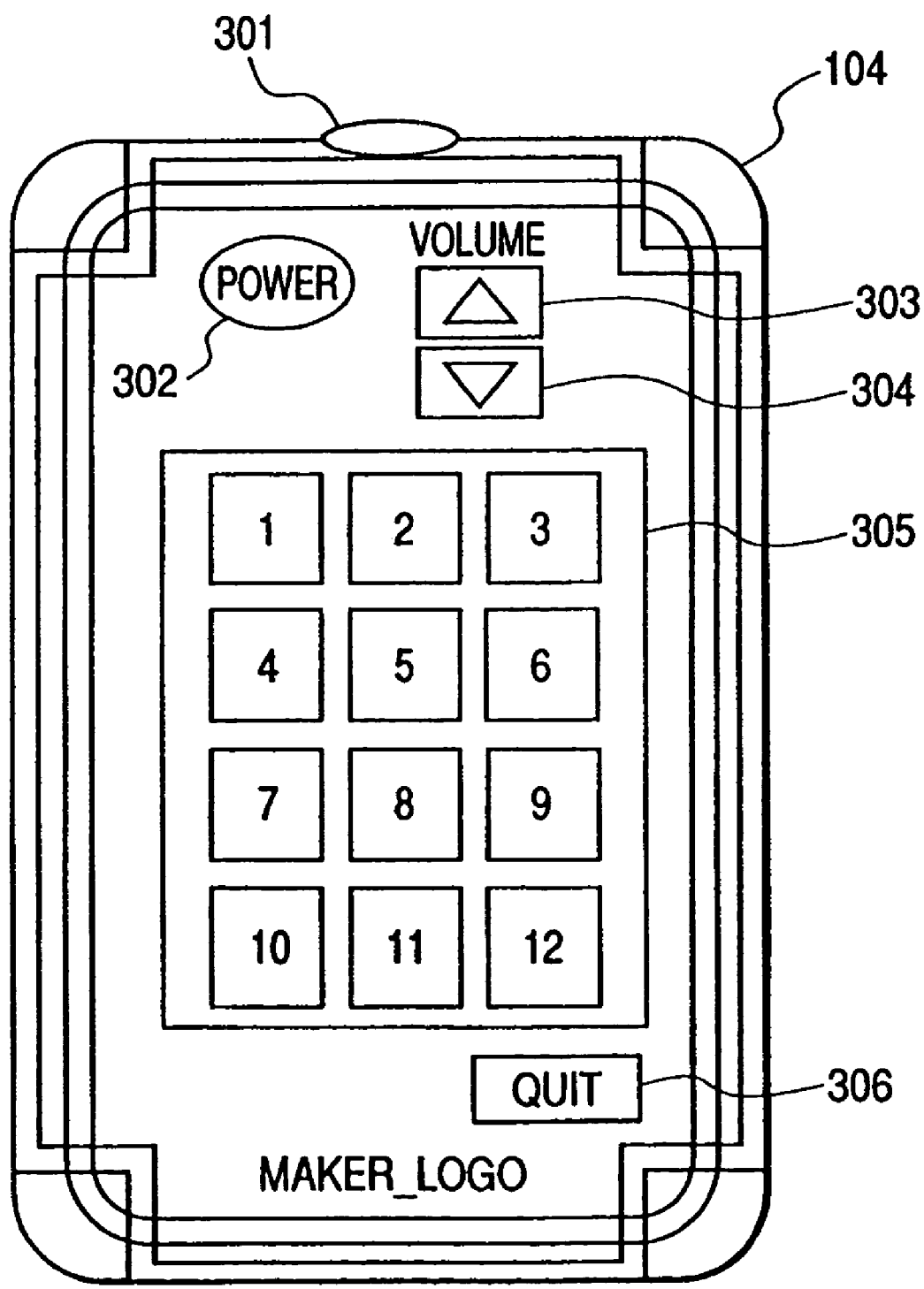
FIG. 3 is a view showing a remote controller constituting the control device of the above-mentioned embodiment.

FIG. 3 shows the configuration of the remote controller 104 of the present embodiment.

A wireless signal transmitting unit 301 executes wireless transmission of control information, such as a key code, to the remote control interface 228 of the digital television receiver 101.

An operation key 302 is provided for turning on and off the power supply of the digital television receiver 101 by remote control.

Operation keys 303, 304 are provided for controlling the sound loudness of the digital television receiver 101.

A key array 305 includes operation keys arranged in a 3×4 matrix. The operation keys of the key array 305 are respectively marked with numbers "1" to "12" and can be used for selecting television channels, entering alphabets, katakana and hiragana characters, numerals and special symbols, and moving a cursor, displayed on the digital television receiver 101, in the vertical, horizontal or diagonal direction.

A quit key 306 is used, while the digital television receiver 101 executes remote control of a desired device by the remote control panel, for disconnecting the communication with such device.

In the present embodiment, each key in the key array 305 will be hereinafter represented by the numeral printed on such key. For example the key at the upper left corner of the key array 305 will be called "1" key.

In the following there will be explained, with reference to FIGS. 4 and 5, a communication sequence of the remote control device of the present embodiment (namely the digital television receiver 101) for receiving the remote control panel of a desired controlled device and a communication sequence of remote controlling the desired controlled device by such remote control panel.

Figure 4:
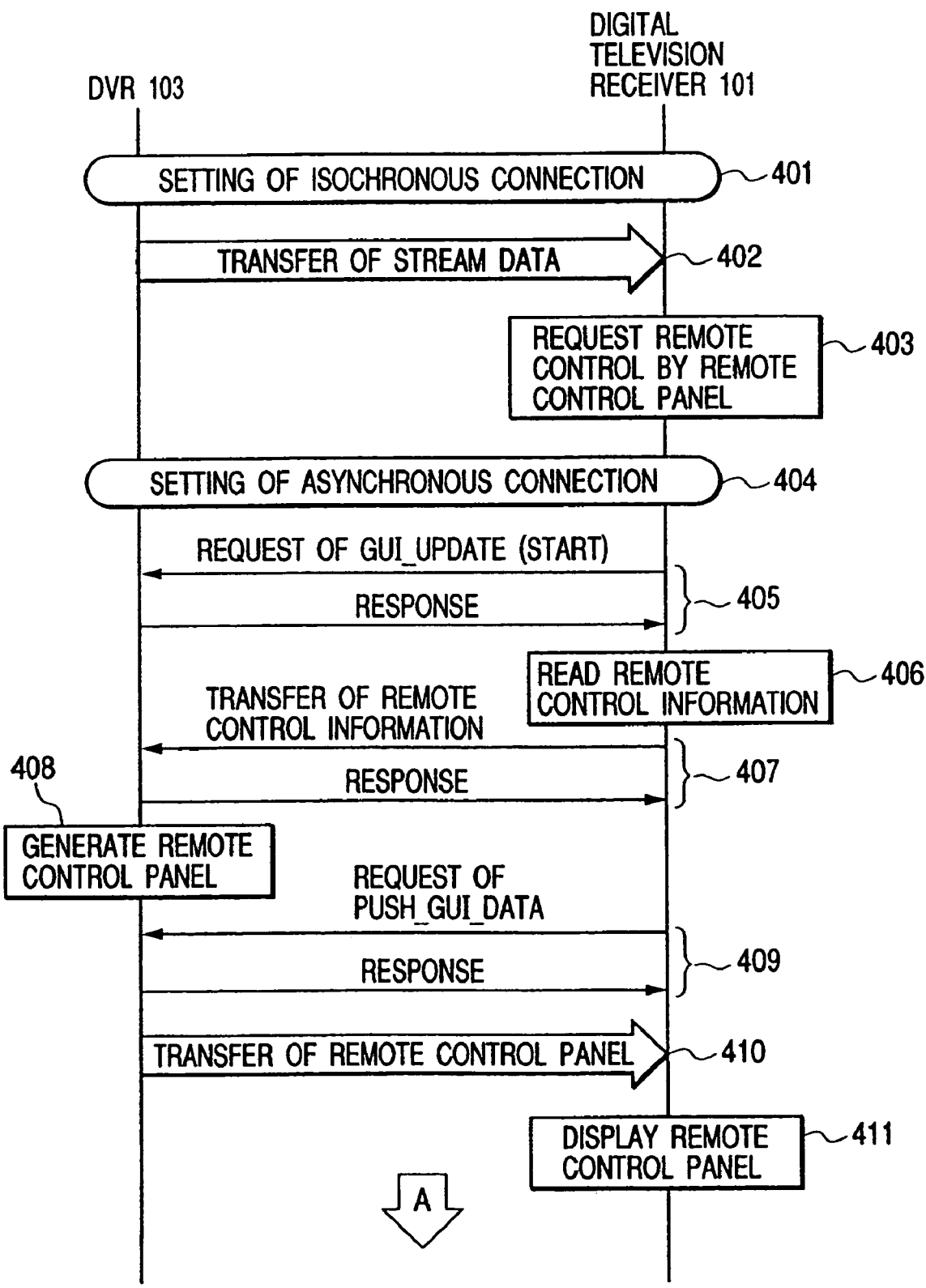
FIG. 4 is a view showing the sequence of transmitting a remote control panel in the above-mentioned embodiment.

At first reference is made to FIG. 4 for explaining the communication sequence of the digital television receiver 101 for receiving the remote control panel of a controlled device (for example DVR 103).

Referring to FIG. 4, the digital television receiver 101 and the DVR 103 secure a communication band required in the isochronous communication period and an isochronous channel based on the AV/C protocol and set an isochronous connection (step 401 in FIG. 4).

After the setting of the isochronous connection, the DVR 103 executes isochronous transfer of the content selected by the digital television receiver 101, utilizing the above-mentioned isochronous channel (402 in FIG. 4). The digital television receiver 101 decodes the received stream data by the decoder unit 226 and displays the image information on the display unit 227 and outputs the audio information from the audio output unit 223.

In case the user request remote control of the DVR 103 by the remote control method of the present embodiment (403 in FIG. 4), the digital television receiver 101 sets an asynchronous serial bus connection with the DVR 103 based on the asynchronous serial bus connection protocol (404 in FIG. 4).

After the setting of the asynchronous serial bus connections, the digital television receiver 101 issues a Gui_Update (start) command, as an AV/C command, to the DVR 103 (405 in FIG. 4).

The Gui_Update(start) command is a control command for instructing, in case the remote control panel displayed on the digital television receiver 101 is changed for example by a user operation, transmission of new display data corresponding to such change to the digital television receiver 101. This control command allows the digital television receiver 101 to visually inform the user of any change in the remote control panel whenever such change is generated, and the user can visually confirm the response as the result of the operation executed by the user. This command remains effective until the DVR 103 receives a Gui_Update(stop) command.

Then the control unit 230 of the digital television receiver 101 read the remote control information of the remote controller 104 from the remote control information memory 229, and sends such information to the 1394 interface 221 (406 in FIG. 4). The 1394 interface 221 executes asynchronous transfer of such remote control information to the DVR 103 through the asynchronous serial bus connection (407 in FIG. 4). The DVR 103 stores the remote control information in a memory of the display panel generation unit 212.

Based on the remote control information, the display panel generation unit 212 of the DVR 103 reconstructs its remote control panel stored in advance, and stores the reconstructed remote control panel in the memory display panel generation unit 212 (408 in FIG. 4). More specifically, the display panel generation unit 212 reconstructs its remote control panel so as to match the key configuration of the remote controller 104.

Then the 1394 interface 221 of the digital television receiver 101 issues a control command (Push_Gui_Data command) for requesting the remote control panel of the DVR 103 (409 in FIG. 4).

After the reception of the Push_Gui_Data command, the display panel generation unit 212 of the DVR 103 supplies the 1394 interface 213 with the reconstructed remote control panel. The 1394 interface 213 asynchronous transfers such remote control panel to the digital television receiver 101 through the asynchronous serial bus connection (410 in FIG. 4).

The 1394 interface 221 of the digital television receiver 101 receives the remote control panel of the DVR 103 and stores the remote control panel in the display panel memory 224. The drawing control unit 225 controls the readout of the remote control panel, and the image synthesizing unit 226 synthesizes the remote control panel with another image so as to display the the display unit 227 displays the output of the image synthesizing unit 226 (411 in FIG. 4).

The drawing control unit 225 executes such control, when necessitated, as to display the remote control panel of the DVR 103 together with the remote control panel of another device.

The above-described communication sequence, shown in FIG. 4, allows the DVR 103 to generate a remote control panel matching the key configuration of the remote controller 104 of the digital television receiver 101, and the digital television receiver 101 can display such remote control panel. Therefore the digital television receiver 101 can provide a graphical user interface easy to understand and to use and can also provide an operation environment based on such user interface.

In the following there will be explained a communication sequence of operating the remote control panel of the DVR 103 with the remote controller 104 for remote controlling the digital television receiver 101 thereby remote controlling the DVR 103.

Referring to FIG. 5, the user actuates the operation keys of the remote controller 104, thereby remote controlling the remote control panel of the DVR 103 displayed on the digital television receiver 101 (501 in FIG. 5).

The remote controller 104 sends a wireless control signal, corresponding to an operation input (User_Action), to the remote control interface 228 of the digital television receiver 101 (502 in FIG. 5). The control unit 203 of the digital television receiver 101 detects an operation key on the remote control panel, corresponding to such wireless control signal (503 in FIG. 5).

The control unit 230 of the digital television receiver 101 issues a User_Action command for informing the remote control panel of the user operation, thereby executing informing to the DVR 103 through the 1394 interface 221 (504 in FIG. 5).

The 1394 interface 213 of the DVR 103 receives the User_Action command and sends it to the control unit 214, which in response executes control corresponding to such User_Action command (505 in FIG. 5).

The display panel generation unit 212 of the DVR 103 detects whether the remote control panel has to be changed as a result of the control corresponding to the User_Action command. If a change is necessary, there are generated data of all the remote control panel after the change or of a part to be changed, and such generated data are supplied as changing data to the 1394 interface 213. The 1394 interface 213 executes asynchronous transfer of such changing data to the digital television receiver 101 through the asynchronous serial bus connection (506 in FIG. 5).

The 1394 interface 221 of the digital television receiver 101 sends the changing data to the display panel memory 224. The drawing control unit 225 renews the displayed remote control panel with such changing data, thereby visually informing the user of the response to the operation input (607 in FIG. 5).

In case the user enters a request of receiving stream data, different from the stream data in current reception, from another controlled device (namely from the tuner 102) (508 in FIG. 5), the digital television receiver 101 sets another isochronous connection with the tuner 102 which supplies the desired stream data (509 in FIG. 5).

After the setting of the new isochronous connection, the tuner 102 executes isochronous transfer of the content selected by the digital television receiver 101, utilizing another isochronous channel (510 in FIG. 5). The digital television receiver 101 decodes the received stream data by the decoder unit 226, then displays the image information on the display unit 227 and outputs the audio information from the audio output unit 223.

In case of remote controlling the tuner 102 by the remote control method of the present embodiment like the DVR 103 (511 in FIG. 5), the digital television receiver 101 sets a new asynchronous serial bus connection with the tuner 102 based on the asynchronous serial bus connection protocol (512 in FIG. 5).

After the setting of the asynchronous serial bus connection, the digital television receiver 101 issues a Gui_update (start) command, as an AV/C command, to the tuner 102, as in the step 405 in FIG. 4. Thereafter the digital television receiver 101 and the tuner 102 execute a process similar to that in the steps 406 to 411 in FIG. 4, thereby displaying, on the display unit 227, the remote control panel of the tuner 102 matching the key configuration of the remote controller 104, together with the remote control panel of the DVR 103.

When the user manipulates the remote controller 104 to instruct the termination of the remote control for the DVR 103, the 1394 interface 221 of the digital television receiver 101 transmits a Gui_Update (stop) command to the DVR 103 (513 in FIG. 5).

Then the 1394 interface 221 of the digital television receiver 101 releases the asynchronous serial bus connection with the DVR 103 (514 in FIG. 5), and also releases the isochronous channel with the DVR 103 (515 in FIG. 5).

The above-described communication sequence shown in FIG. 5 allows the user to manipulate the remote control panel utilizing the remote controller 104 for remote controlling the digital television receiver 101, thereby achieving remote control of the controlled device. Also the controlled device can visually inform the user of the change in the remote control panel corresponding to the input operation by the user, thereby preventing the confusion of the user and improving the operability.

In the foregoing there has been explained the communication sequence between the digital television receiver 101 and the DVR 103 with reference to FIGS. 4 and 5, but such configuration is not restrictive. For example the tuner 102 may be selected as the controlled device, and the communication sequence shown in FIGS. 4 and 5 may be applied for remote controlling the tuner 102.

In the following there will be explained, with reference to FIGS. 6A and 6B, the remote control information (including outer frame information of the remote controller and key configuration information) stored in the remote control information memory 229 of the digital television receiver 101.

Figure 12:
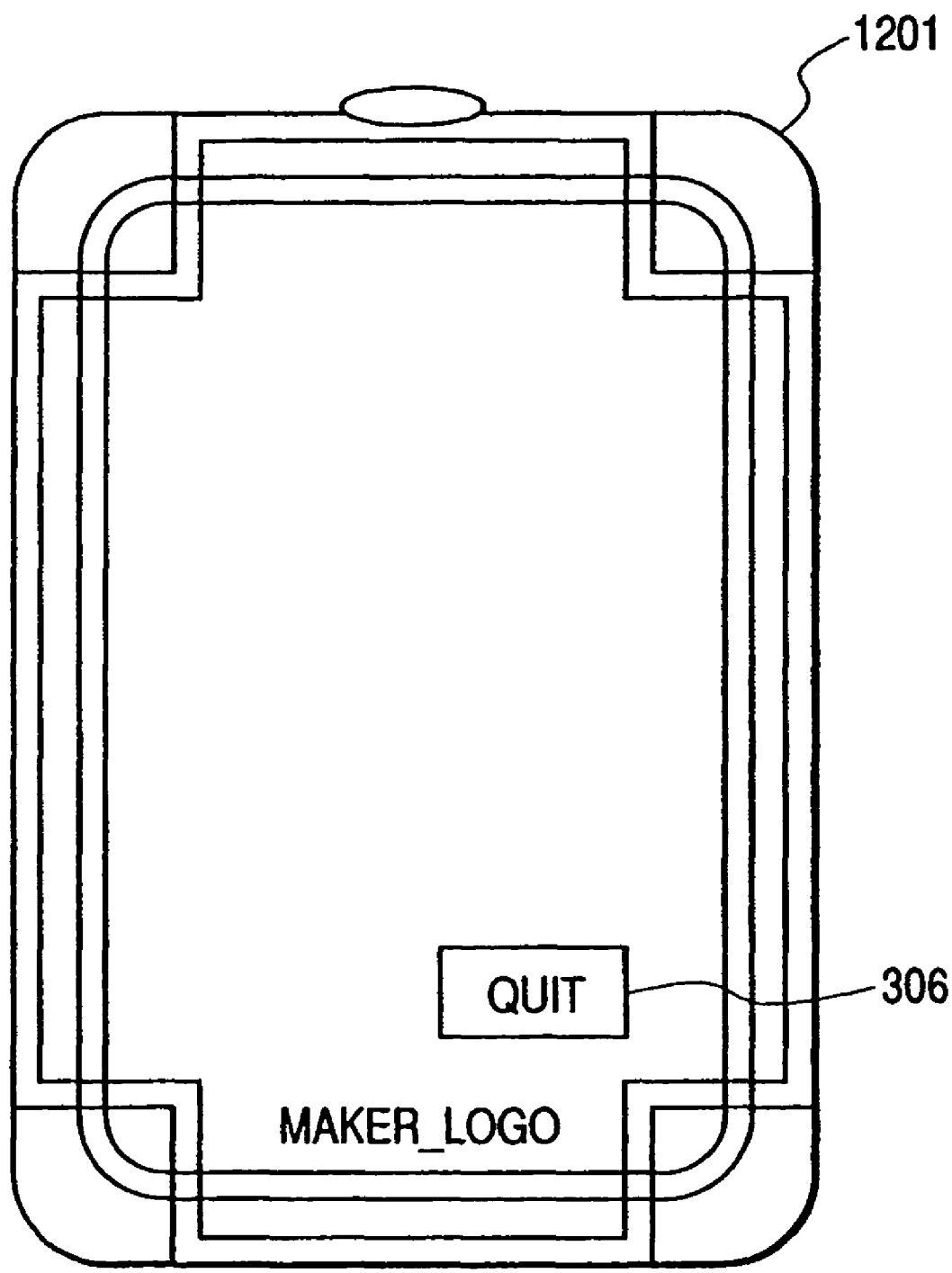
FIG. 12 is a view showing an example of image data of the above-mentioned embodiment in which an outer frame of the remote controller is graphically designed.

FIG. 6A is a view showing the shape of the outer frame of the remote controller 104 and the shape of the basic operations keys thereof on a two-dimensional coordinate system. The remote control information memory 229 stores, as the remote control frame information, the shape of the outer frame of the remote controller 104, the position of the original point of the outer frame and the vertical and horizontal lengths thereof. The remote control information memory 229 stores, also as the remote control frame information, image data 1201 showing the graphic design of the outer frame of the remote controller 104 and special operation keys other than the basic operation keys (for example quit key 306), as shown in FIG. 12.

In FIG. 6A, the origin point 601 is for example taken at the upper left corner of the remote controller 104, with the x-axis taken in the horizontal direction and the y-axis in the vertical direction. The position of each basic operation key is represented by a two-dimensional coordinate value (x, y) representing the center of the operation key. Also, the size of each basic operation key is represented by a two-dimensional value (l, m) wherein "l" and "m" are relative values defined in relation to the vertical length L of the remote controller 104.

FIG. 6B shows a table 600 storing the key configuration information of the basic operation keys. The remote control information memory 229 stores such table 600 as key configuration information.

Referring to FIG. 6B, a name column 602 stores the names of the operation keys. A key ID column 603 stores sequential ID numbers assigned to the operation keys. A shape column 604 stores codes indicating the frame shapes of the operation keys. For example, "2" indicates an oval key while "00" indicates a rectangular key. A position column 605 stores data (x, y) indicating the position of each operation key on the remote controller 104. A size column 606 stores data (l, m) indicating the size of each operation key.

In the following there will be explained, with reference to FIG. 7, an example of the remote control panel stored in advance in the display panel generation unit 212 of the DVR 103.

There are shown an entire remote control panel 701; an icon 702 for instructing a reproducing operation; an icon 703 for instructing a varied-speed reproducing operation in the forward direction; an icon 704 for instructing a varied-speed reproducing operation in the reverse direction; an icon 705 for instructing a stop; an icon 706 for instructing a reproducing operation for an immediately succeeding or subsequent index, chapter or content; an icon 707 for instructing a reproducing operation of an immediately preceding or preceding index, chapter or content; and an icon 708 for instructing a pause. A link icon 709 is used, in case the remote control panel of the DVR 103 has a hierarchic structure, for requesting a remote control panel in an upper or lower hierarchic layer. The icons 701 to 709 are constructed with image information (for example patterns) for helping the visual understanding of the corresponding function.

The remote control unit 701 of the DVR 103 is composed of plural icons 702 to 709 for controlling the functions of the DVR 103. The icons are given a predetermined order of priority, in consideration of the frequency of use and the importance of the corresponding functions. Also the icons representing the functions of high frequencies of use or those representing the functions important for the user are so constructed as to be conspicuous to the user, and are positioned close to the center of the panel 701, thereby facilitating the selection by the user.

FIG. 8 shows an example of the order of priority, set on the icons 702 to 709. An icon column 801 indicates the icons 702 to 709, and a priority order column 802 indicates an example of the order of priority set on the icons 702 to 709. In the present embodiment, an icon with a smaller number is handled as the icon of a higher order or priority for display (namely positioned closer to the center).

In the following there will be given a detailed explanation, with reference to FIG. 9, on an example of the sequence executed by the display panel generation unit 212 of the DVR 103 for reconstructing its remote control panel 701, based on the remote control information of the digital television receiver 101.

Figure 9:
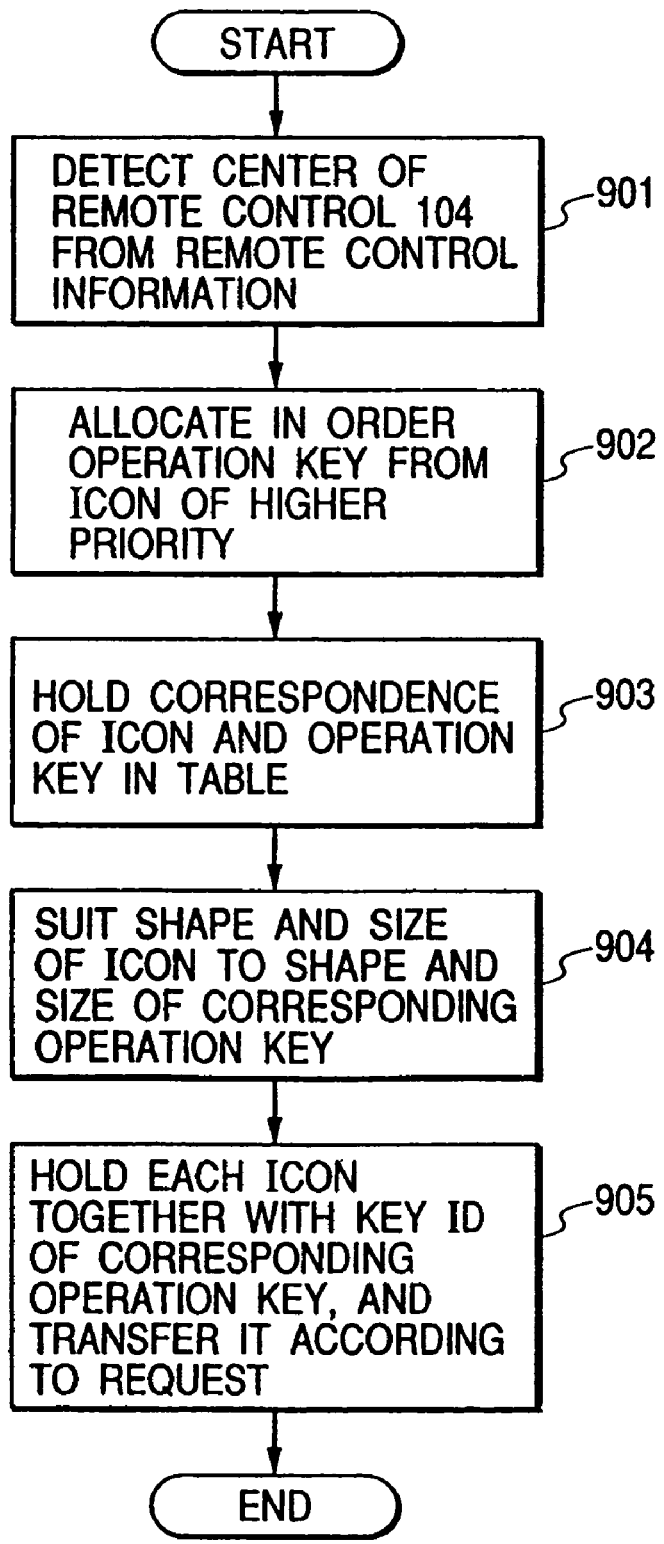
FIG. 9 is a flowchart showing an example of the sequence for reconstituting the hd remote control panel shown in FIG. 7.

Referring to FIG. 9, the display panel generation unit 212 detects, based on the remote control information, a basic operation key conspicuous to the user, for example the "5" key positioned close to the center of the remote controller 104 (step 901).

Then the display panel generation unit 212 assigns the icons 701 to 709 in succession to the basic operations keys of the remote controller 104, based on the order of priority shown in FIG. 8 (step 902). More specifically, the display panel generation unit 212 executes assignment in the descending order of priority of the icons, around the "5" key detected in the step 901.

In each assignment of the icons 702 to 709 to the basic operation keys of the remote controller 104, the display panel generation unit 212 holds the result of such assignment in a correspondence table 1000 shown in FIG. 10 (step 903). In FIG. 10, an icon information column 1001 indicates icons 702 to 709, and a key ID column 1002 indicates the sequential ID numbers (same as the key ID numbers shown in FIG. 6) assigned to the basic operation keys.

After the step 903, the display panel generation unit 212 deforms, based on the key configuration information, the size and shape of the icons 702 to 709 so as to match those of the corresponding basic operation keys (step 904).

After the execution of the process on all the icons 702 to 709, the display panel generation unit 212 stores the remote control panel, including the deformed icon information, together with the table information shown in FIG. 10, and asynchronous transfers such information in response to a Push_Gui_Data command (409 in FIG. 4) from the digital television receiver 101 (step 905).

The process sequence described above is not limited to the display panel generation unit 212 of the DVR 103 but can also be executed by the display panel generation unit 202 of the tuner 102.

Now reference is made to FIG. 11 for explaining the management of the remote control panel of each controlled device in the display panel memory 224 of the digital television receiver 101.

After issuing the Push_Gui_Data command to the DVR 103, the digital television receiver 101 receives the remote control panel (including plural icons) reconstructed by the DVR 103 according to the sequence shown in FIG. 9 and the key ID indicating the operation keys corresponding to the respective icons, and supplies the display panel memory 224 with such information.

The display panel memory 224 manages the remote control panels of the controlled devices, utilizing a table 1100 shown in FIG. 11. The table 1100 is so constructed as to store the device ID 1101, the node ID 1102 and the icon information corresponding to each key ID.

The device ID 1101 means an individual ID capable of identifying the manufacturer and product of the device corresponding to the IEEE1394-1995 standard. The device ID 1101 corresponds in the configuration ROM provided in the 1394 interface of each device, the Node Vendor ID in the Bus_info_Block field, or the Module Vendor ID or Module Spec ID in the Root_Directory field. The digital television receiver 101 is so constructed as to read the device ID 1101 from the configuration ROM of each controlled device and to store such ID in the table 1100. For example, in the present embodiment, "bbbbbbbb" indicates the DVR 103, and "cccccccc" indicates the tuner 102.

Also the node ID is a node number assigned to each controlled device after the bus resetting, and a desired device can be specified by such node number on the local bus.

For example, in case of storing the information of the DVR 103 in the table 1100, "bbbbbbbb" is stored in the device ID 1101 and "3" is stored in the node ID. Also in the key ID="3" (corresponding to the key "1" in FIG. 3), there is stored the icon 707 designating the start point of the reproduction of the preceding content etc., while, in the key ID="5" (corresponding to the key "3" in FIG. 3) there is stored the icon 706 designating the start point of the reproduction of the succeeding content and, in the key ID="6" there is stored the icon 704 designating the varied-speed reproduction in the reverse direction.

Figure 13:
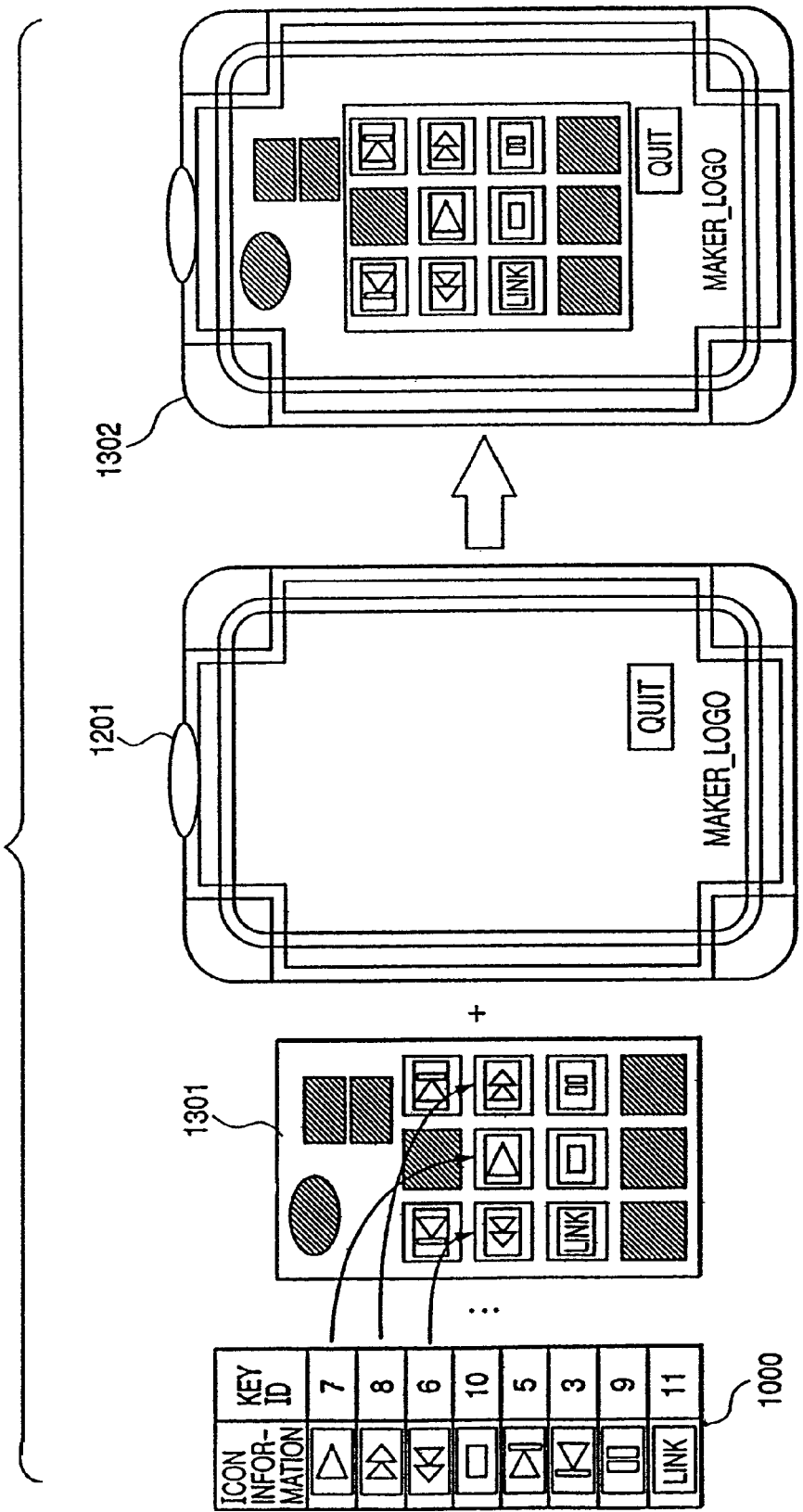
FIG. 13 is a view showing an example of the sequence for synthesizing the remote control panel in the above-mentioned embodiment.

In the following reference is made to FIG. 13 for explaining an example of the sequence of the drawing control unit 225 of the digital television receiver 101 for drawing the remote control panel of the DVR 103 on the display image frame. FIG. 13 shows the flow of preparing the remote control panel of the DVR 103 and an example of thus displayed remote control panel.

In FIG. 13, image data 1201 is the remote control frame information indicating the (schematic) outer frame of the remote controller and is stored in the remote control information memory 229. There are also shown a remote control panel 1301 constructed from the key configuration information of the remote controller 104, and an example of the remote control panel 1302 actually displayed on the display unit 227.

At first the drawing control unit 225 reads the image data 1201, schematically representing the outer frame of the remote controller 104, stored in advance in the remote control information memory 229, and executes synthesis with the image information from the decoder unit 222 in such a manner as to execute display in a predetermined position on the image area.

Then the drawing control unit 225 constructs the remote control panel 1301 based on the key configuration information and the information stored in the table 1100.

At this stage, the drawing control unit 225 arranges, within the remote control panel 1301, the icons 702 to 709 reconstructed by the DVR 103 in positions same as those of the respectively corresponding operation keys. If an icon corresponding to the operation key is absent, the drawing control unit 225 prepares a blank icon and positions such blank icon in a position same as that of the operation key.

Then the drawing control unit 225 synthesizes the remote control panel 1301, so constructed as to match the operation keys of the remote controller 104, with the image data 1201 and displays the synthesized image on the display unit 227 through the image synthesizing unit 226. As a result, the digital television receiver 101 can display the control panel, for remote control of the DVR 103, in a form similar to that of the remote controller 104.

The above-described sequence allows the digital television receiver 101 to display the remote control panel of the DVR 103 or the controlled device, in a form similar to that of the remote controller 104 serving to remote control the DVR itself. Also the user can execute remote control of the function of the DVR 103 in an operation environment same as that of the remote controller 104.

The remote control pane 1302 shown in FIG. 13 may be arbitrarily changed, on the display screen of the display unit 227, in the size, display position and shape according the input operation of the user. The drawing sequence resulting from such change is controlled by the drawing control unit 225, and the information resulting from such change is retained in the display panel memory 224.

In FIG. 13, a hatched area indicates the absence of assignment of the function that can be remote controlled by the icon. Therefore, the icon not corresponding to the remote control by the remote controller 104 may be displayed by synthesizing (α-blending) with the background (image information from the decoder unit 222).

Figure 14:
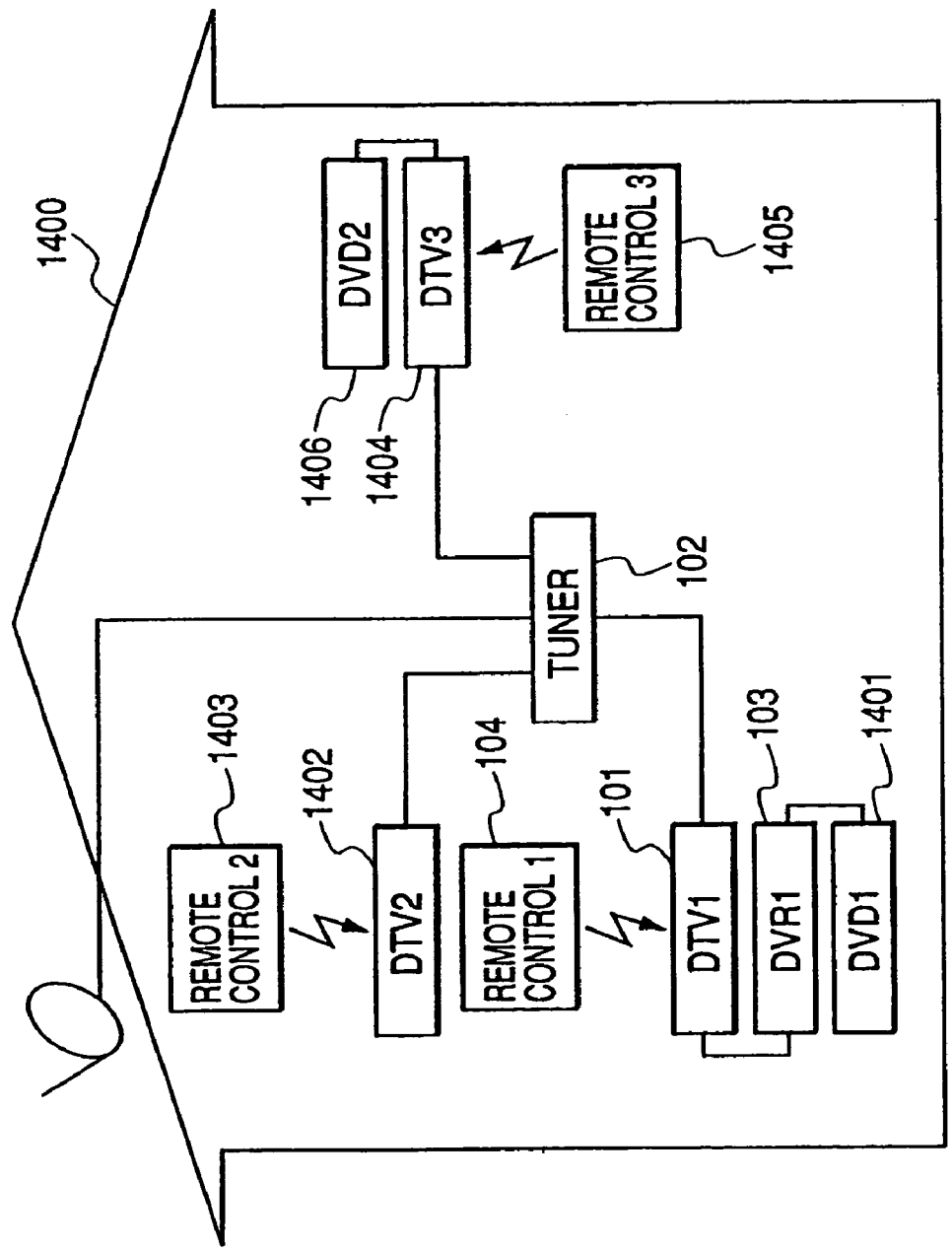
FIG. 14 is a view showing an example of application of the data communication system of the above-mentioned embodiment to a home network.

FIG. 14 shows an example of the application of the operation environment, based on the user interface of the present embodiment, to a home network. A home network 1400 shown in FIG. 14 is constructed by a high-speed serial bus network based on the IEEE1394-1995 standard. Such network 1400 is capable of node branched connection or daisy chain connection, and the 1394 interface of each device has a function of relaying the serial data outputted by other devices.

In FIG. 14 there are shown a first DVD (digital video disk) player 1401; a second digital television receiver 1402; a remote controller 1403 for remote controlling the digital television receiver 1402; a third digital television receiver 1404; a remote controller 1405 for remote controlling the digital television receiver 1404; and a second DVD player 1406.

The digital television receivers 1402, 1404 are remote control devices similar in function to the digital television receiver 101 explained in the foregoing. The three digital television receivers 101, 1402, 1404 are positioned in respectively different rooms.

Also the DVD players 1401, 1406 have a function, like the tuner 102 and the DVR 103 described in the foregoing, of generating a remote control panel matching the operation keys of the respective remote controller, based on the remote control information of the remote controllers 104, 1403, 1405.

The above-described home network allows each of the three digital television receivers 101, 1402, 1404, positioned in respectively different rooms, to display the remote control panel of one or more controlled devices positioned in the same or different room, based on the sequence shown in FIG. 4. Also each of the digital television receivers 101, 1402, 1404 can easily and arbitrarily control the desired controlled device by the operation on the remote control panel, displayed on the display area, according to the sequence shown in FIG. 5. Further, each of the digital television receivers 101, 1402, 1404 can visually display the result of such remote control on the remote control panel.

OTHER EMBODIMENTS

The above-described embodiment can also be realized in the following manner.

For example there may be assumed a configuration of storing a program realizing the process sequence of the foregoing embodiment shown in FIGS. 4 and 5 in the memory media 206, 216, 231, and supplying such memory media respectively to the control units 204, 214, 230, whereby the control units 204, 214, 230 read the program codes stored in the memory media 206, 216, 231 and operates the process circuits shown in FIG. 10 so as to realize the functions of the aforementioned embodiment.

In such case, the program itself read from the memory media 206, 216, 231 realize the functions of the aforementioned embodiment, and the memory media 206, 216, 231 storing such program constitute a part of the present invention.

The memory medium 206, 216 or 231 supplying the program can be composed, for example, of a floppy disk, a hard disk, an optical disk, a magnetooptical disk, a CD-ROM, a CD-R, a magnetic tape, a non-volatile memory car or a ROM.

As explained in the foregoing, the present invention can provide a graphical user interface which is simple and easy to understand and can avoid complication of the operation sequence and confusion of the user. Such graphical user interface allows the user to remote control the desired device in an easily understandable and speedy manner.

The present invention may be embodied in other specific forms without departing from the spirit or essential characteristics thereof.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A control system, comprising:
a receiver which is remotely controlled by a remote controller which includes operation keys having pre-set position, size, and shape; and
a recorder which transmits a modified control panel, before the receiver transmits any control command generated by use of a basic control panel and any control command generated by use of the modified control panel to the recorder for controlling the recorder, to the receiver, the modified control panel including icons used to control the recorder, thereby a user can remotely control the recorder via the remote controller of the receiver,
wherein the recorder comprises (a) a communication interface which receives, from the receiver, information about the pre-set position, size, and shape of the operation keys of the remote controller, the information about the pre-set position, size, and shape of the operation keys of the remote controller being received from the receiver before the recorder transmits the modified control panel to the receiver, (b) a memory which stores the basic control panel of the recorder, and (c) a control panel generator which modifies position, size, and shape of icons included in the basic control panel of the recorder using the information about the pre-set position, size, and shape of the operation keys of the remote controller to generate the modified control panel, and
wherein the communication interface transmits, to the receiver, the modified control panel in which the position, size, and shape of the icons included in the basic control panel of the recorder are modified using the information about the pre-set position, size, and shape of the operation keys of the remote controller.

2. The control system according to claim 1, wherein each of the icons are used to control a function of the recorder.

3. The control system according to claim 1, wherein the control panel generator modifies the basic control panel using information about an outer frame of the remote controller before the modified control panel is transmitted from the recorder to the receiver, and
wherein the information about the outer frame of the remote controller is included received from the receiver by the communication interface.

4. The control system according to claim 1, wherein the receiver receives a control signal from the remote controller by wireless communication.

5. The control system according to claim 1, wherein the communication interface conforms to IEEE 1394-1995 standard.

6. The control system according to claim 1, wherein the modified control panel is a graphical user interface used to control the recorder.

7. A recorder which transmits a modified control panel, before a receiver transmits any control command generated by use of a basic control panel and any control command generated by use of the modified control panel to the recorder for controlling the recorder, to the receiver remotely controlled by a remote controller, the modified control panel including icons used to control the recorder, the remote controller including operation keys having pre-set position, size, and shape, and the recorder comprising:
a communication interface which receives, from the receiver, information about the pre-set position, size, and shape of the operation keys of the remote controller, the information about the pre-set position, size, and shape of the operation keys of the remote controller being received from the receiver before the recorder transmits the modified control panel to the receiver;
a memory which stores the basic control panel of the recorder; and
a control panel generator which modifies position, size, and shape of icons included in the basic control panel of the recorder using the information about the pre-set position, size, and shape of the operation keys of the remote controller to generate the modified control panel, wherein the communication interface transmits, to the receiver, the modified control panel in which the position, size, and shape of the icons included in the basic control panel of the recorder are modified using the information about the pre-set position, size, and shape of the operation keys of the remote controller, thereby a user can remotely control the recorder via the remote controller of the receiver.

8. The recorder according to claim 7, wherein each of the icons are used to control a function of the recorder.

9. The recorder according to claim 7, wherein the control panel generator modifies the basic control panel using information about an outer frame of the remote controller before the modified control panel is transmitted from the recorder to the receiver, and wherein the information about the outer frame of the remote controller is received from the receiver by the communication interface.

10. The recorder according to claim 7, wherein the receiver receives a control signal from the remote controller by wireless communication.

11. The recorder according to claim 7, wherein the communication interface conforms to IEEE 1394-1995 standard.

12. The recorder according to claim 7, wherein the modified control panel is a graphical user interface used to control the recorder.

13. A method for controlling a recorder which includes a memory storing a basic control panel of the recorder and transmits a modified control panel, before a receiver transmits any control command generated by use of the basic control panel and any control command generated by use of the modified control panel to the recorder for controlling the recorder, to the receiver remotely controlled by a remote controller, the modified control panel including icons used to control the recorder, the remote controller including operation keys having pre-set position, size, and shape, and the method comprising the steps of:

in the recorder, receiving, from the receiver, information about the pre-set position, size, and shape of the operation keys of the remote controller, the information about the pre-set position, size, and shape of the operation keys of the remote controller being received from the receiver before the recorder transmits the modified control panel to the receiver;

modifying position, size, and shape of icons included in the basic control panel of the recorder using the information about the pre-set position, size, and shape of the operation keys of the remote controller to generate the modified control panel; and transmitting, to the receiver, the modified control panel in which the position, size, and shape of the icons included in the basic control panel of the recorder are modified using the information about the pre-set position, size, and shape of the operation keys of the remote controller, thereby a user can remotely control the recorder via the remote controller of the receiver.

14. The method according to claim 13, wherein each of the icons are used to control a function of the recorder.

15. The method according to claim 13, further comprising a step of modifying the basic control panel using information about an outer frame of the remote controller before the modified control panel is transmitted from the recorder to the receiver, wherein the information about the outer frame of the remote controller is received from the receiver.

16. The method according to claim 13, wherein the receiver receives a control signal from the remote controller by wireless communication.

17. The method according to claim 13, further comprising a step of transmitting the modified control panel generated in the recorder to the receiver through a communication interface conforming to IEEE 1394-1995 standard.

18. The method according to claim 13, wherein the modified control panel is a graphical user interface used to control the recorder.

* * * * *